United States Patent
Shiraishi et al.

(10) Patent No.: US 7,737,095 B2
(45) Date of Patent: Jun. 15, 2010

(54) HYDRODYNAMIC BEARING DEVICE, AND SPINDLE MOTOR AND INFORMATION DEVICE USING THE SAME

(75) Inventors: Takanori Shiraishi, Ozu (JP); Katsushi Hirata, Ozu (JP); Hideaki Ohno, Sennan (JP)

(73) Assignee: Panasonic Corporation, Osaka (JP)

( * ) Notice: Subject to any disclaimer, the term of this patent is extended or adjusted under 35 U.S.C. 154(b) by 1116 days.

(21) Appl. No.: 11/360,509

(22) Filed: Feb. 24, 2006

(65) Prior Publication Data

US 2006/0171613 A1 Aug. 3, 2006

Related U.S. Application Data

(63) Continuation-in-part of application No. 11/211,687, filed on Aug. 26, 2005, now abandoned.

(30) Foreign Application Priority Data

Oct. 28, 2005 (JP) ............................ 2005-314680

(51) Int. Cl.
*C10M 129/16* (2006.01)
(52) U.S. Cl. ..................... 508/579; 568/579; 384/13
(58) Field of Classification Search ............... 508/579; 384/13; 568/579
See application file for complete search history.

(56) References Cited

U.S. PATENT DOCUMENTS

| 2,973,388 | A | * | 2/1961 | Riemschneider | ............ 568/673 |
| 4,374,282 | A | * | 2/1983 | Maldonado et al. | ......... 568/672 |
| 6,193,906 | B1 | * | 2/2001 | Kaneko et al. | ................ 252/68 |
| 2002/0173431 | A1 | * | 11/2002 | Hirata | ........................ 508/107 |
| 2005/0117823 | A1 | * | 6/2005 | Duong | ........................ 384/276 |

FOREIGN PATENT DOCUMENTS

| JP | 2000-336383 | 12/2000 |
| JP | 2001-316687 | 11/2001 |
| JP | 2002-195252 | 7/2002 |
| JP | 2002-206094 | 7/2002 |
| JP | 2002-348586 | 12/2002 |

\* cited by examiner

*Primary Examiner*—Glenn A Caldarola
*Assistant Examiner*—Vishal Vasisth
(74) *Attorney, Agent, or Firm*—Wenderoth, Lind & Ponack, LLP.

(57) ABSTRACT

A hydrodynamic bearing device comprises at least one of a rotating component and a fixed component having a dynamic pressure-generating mechanism, and a lubricant present in a gap between the rotating component and the fixed component; wherein the lubricant contains at least one compound selected from the group consisting of aliphatic ethers having one or more ether bonds and a total carbon number of 24 to 39.

1 Claim, 2 Drawing Sheets

HYDRODYNAMIC BEARING DEVICE, AND SPINDLE MOTOR AND INFORMATION DEVICE USING THE SAME

This application is a Continuation-in-Part of Ser. No. 11/211,687, filed Aug. 26, 2005 now abandoned.

BACKGROUND OF THE INVENTION

1. Field of the Invention

The present invention relates to a dynamic pressure-type hydrodynamic bearing device, as well as a spindle motor and information device using the same.

2. Description of the Prior Art

A hydrodynamic bearing device comprises a shaft and a sleeve that supports the shaft, and a lubricant that is interposed in the gap between the two parts. With rotation of the shaft, the lubricant is gathered up by dynamic pressure-generating grooves that are formed on the shaft or sleeve, and generates pressure such that the shaft is supported within the sleeve without coming into contact therewith. As a result, when high-speed rotation is attained, ambient noise during the rotation can be alleviated.

A spindle motor equipped with such a hydrodynamic bearing device can provide the requisite rotational accuracy with an increased recording density of the medium, and can furthermore provide excellent shock resistance and quietness. Thus, it can be used in a majority of motors for application in such representative magnetic disk devices as information technology equipment and audio-visual equipment.

In recent years, the demand has grown stronger for magnetic disk devices that are increasingly miniaturized and more energy-conserving, for decreased power consumption for the spindle motor that is the main component, and in particular, for reduced torque in the hydrodynamic bearing device that exerts a significant influence on decreasing power consumption in the motor. Since the torque of the hydrodynamic bearing device will be roughly proportional to the viscosity of the lubricant used to fill the device, using a lower viscosity lubricant is an effective way to reduce the torque.

For this reason, esters such as dioctyl sebacate (DOS), dioctyl azelate (DOZ), and dioctyl adipate (DOA) have been proposed for use as lubricants in hydrodynamic bearing devices. Moreover, esters obtained from neopentyl glycol and C6 to C12 monovalent fatty acids and/or their derivatives for use as lubricants in hydrodynamic bearing devices (see for example Japanese published unexamined application No. 2001-316687), the use of esters represented by the generic formula $R^1$—COO-$(AO)_n$—$R^2$ as lubricants for bearings (see for example Japanese published unexamined application No. 2002-206094), and ethers containing viscosity index improvers and anti-wear agents (see for example Japanese published unexamined application No. 2002-348586), have been proposed.

However, while it is possible to reduce the torque in such conventional hydrodynamic bearing devices, since the heat resistance of the lubricant is low (vapor pressure is high), the amount of evaporation will be significant when used over a long period, and it will not be possible to maintain the quantity of lubricant required for stabilized rotation of the bearing device. Consequently, there will be problems with the device having inadequate reliability and the operational lifetime will be shorter.

As a countermeasure to the amount of evaporation, one can consider a method by which the above requirement is addressed by adding an excess of the lubricant. However, this approach will entail problems in that this additional amount can increase the torque and bring a higher cost, and accommodating the additional space will make miniaturization more difficult.

Moreover, resins can undergo dissolution or swelling from coming into contact with ester-type lubricants, leading to the deterioration and lower performance of the resins used in the bearing components or in the material of the seals. This limits the choice of resins that can be used.

Moreover, Japanese published unexamined application No. 2002-348586 teaches that when polymeric viscosity index improvers are added to the lubricant, the molecular bonds of the polymer are cleaved by shearing forces after long-term use at high speed rotations, which will cause marked changes in the viscosity, and raises concerns that the reliability of the hydrodynamic bearing will be impaired.

SUMMARY OF THE INVENTION

The present invention provides a hydrodynamic bearing device, comprising at least one of a rotating component and a fixed component having a dynamic pressure-generating mechanism, and a lubricant present in a gap between the rotating component and the fixed component;

wherein the lubricant contains at least one compound selected from the group consisting of aliphatic ethers having one or more ether bonds and a total carbon number of 24 to 39.

An object of the present invention is to provide an information device, spindle motor and magnetic disk device with low power consumption and high reliability, that are suitable for miniaturization and have a long operational lifetime, and which realize features such as: (1) providing both a reduction in torque along with a reduction in the extent of evaporation of the lubricant due to the use of a lubricant in the hydrodynamic bearing device having excellent heat resistance and low viscosity; (2) a reduction in the amount of lubricant needed to fill each hydrodynamic bearing device, reduced cost and the possibility of miniaturizing the device; and (3) no need to use viscosity index improvers through the use of lubricants that undergo less temperature-related change in viscosity as compared to conventional lubricants, and where even long-term use and high rotational speeds do not cause marked changes in the viscosity. This invention addresses this object as well as other objects, which will become apparent to those skilled in the art from this disclosure.

Furthermore, the present invention provides a spindle motor equipped with the hydrodynamic bearing device.

In addition, the present invention provides an information device equipped with the spindle motor.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION

Embodiments of the present invention are shown in detail below, and are described with reference to the drawings.

Embodiment 1

Figure 2:
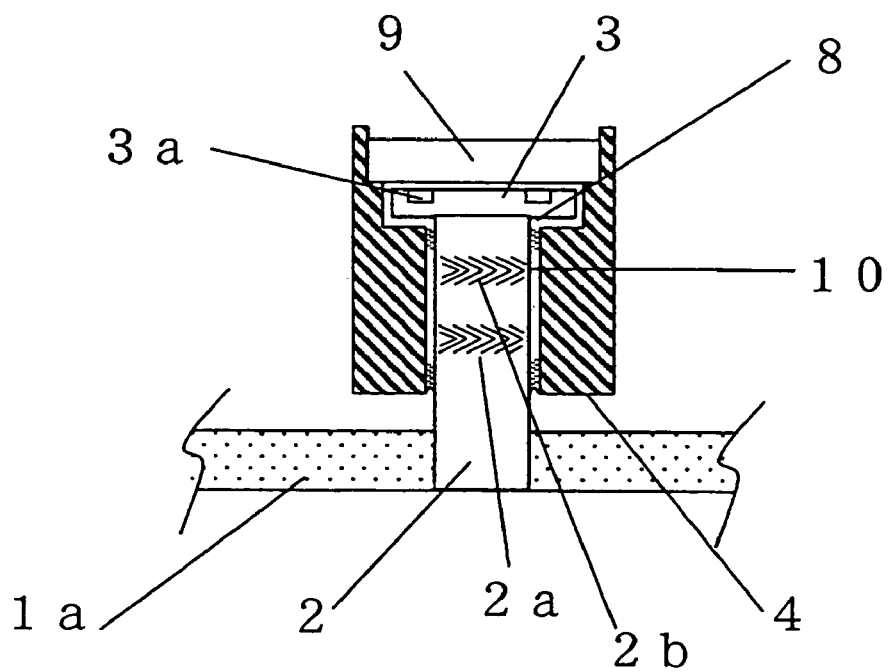
FIG. 2 is a cross section drawing of a hydrodynamic bearing device in a fixed shaft type of Embodiment 1 of the present invention.

Embodiment 1 of the present invention is described with reference to FIG. 2. FIG. 2 is a cross section drawing of the main component for a hydrodynamic bearing device in a fixed shaft type of Embodiment 1.

In FIG. 2, radial dynamic pressure-generating grooves 2a and 2b are formed in a herringbone pattern on the outer circumferential surface of shaft 2. One end of the shaft 2 is affixed to thrust flange 3, and the other end is press fitted into base 1a. Shaft 2 and thrust flange 3 form the shaft component. The shaft component and the base 1a constitute the fixed component. In the present invention, it is unnecessary to constitute the fixed component including all of the shaft 2, the thrust flange 3 and the base 1a. At the same time, sleeve 4 possesses a bearing bore that supports the shaft component. Thrust plate 9 is mounted on one end of sleeve 4. The shaft component is inserted into the bearing bore of sleeve 4 in such a manner as to face thrust plate 9 and thrust flange 3. Sleeve 4 and thrust plate 9 constitute a rotating component. In the present invention, only the sleeve 4 may constitute the rotating component. Thrust dynamic pressure-generating groove 3a is formed in a spiral pattern on the surface of thrust flange 3 opposite to thrust plate 9. The lubricant 8 is filled into the gap 10 between the bearing bore and the shaft component. The rotating component and the fixed component constitute the motor drive component.

With the rotation of rotating component, dynamic pressure-generating grooves 2a and 2b gather up lubricant 8, and pumping pressure is generated in the radial direction at the radial gap 10 between shaft 2 and sleeve 4. Also, with the rotation, dynamic pressure-generating grooves 3a gathers up lubricant 8, and pumping pressure is generated in the thrust direction between thrust flange 3 and thrust plate 9. As a result, the rotating component is buoyed upwards with respect to the fixed portion and is rotatably supported without contact.

Furthermore, rotational speeds of 4,200, 5,400, 7,200, 10,000, or 15,000 rpm are generally used for the motor.

In the hydrodynamic bearing device of the present invention, radial gap 10 between shaft 2 and sleeve 4 is about 1 to about 5 μm, preferably about 1.5 to about 4 μm, and further preferably about 1.5 to about 3 μm. Since the torque generally is inversely proportional to the gap, and the stiffness is inversely proportional to the third power of the gap, it is essential that the gap correspond to the viscosity of the lubricant. Consequently, within a range of gaps, when a lubricant is used with a hydrodynamic bearing device of the present invention, if the effect of a lowered viscosity of the lubricant can be adequately realized, then it is possible to obtain both a lowered torque along with the required stiffness in the bearing.

Generally, if there is a low viscosity lubricant in a hydrodynamic bearing, it is necessary to make the radial gap smaller in order to ensure a given shaft stiffness in a high temperature environment. However, within the above-described range of gaps, the lubricant used in the hydrodynamic bearing device of the present invention will have a minimal effect on the gap, while having a maximal effect on the reduction in torque. Moreover, if the bearing lock produced by contamination with foreign matter or wear particles generated at starting and stopping times can be prevented, it will be possible to increase the reliability of the device. Furthermore, excessively high accuracy in machining and assembling the shaft, sleeve and the like would be unnecessary, which can prevent cost increases. In addition, while realizing a maximal effect from decreasing the viscosity of the lubricant used in the hydrodynamic bearing device of the present invention, the stiffness of the bearing will be maintained, so that sufficient durability can be obtained under conditions of practical use. In addition, increased eccentricity of the shaft is prevented, and fluctuations in the plane of revolution are controlled in a recording medium such as a magnetic disk that is mounted on the spindle motor, so that any consequent reductions in positional accuracy in recording and playback or variations in signal strength will be minimized, and it is possible for information device performance criteria to be adequately satisfied. Furthermore, since the contact area between the lubricant and the air is minimized, oxidative degradation of the lubricant is minimized, and the operational lifetime of the bearing device can be maintained.

Moreover, a diameter of about 1 to about 4 mm for shaft 2 is preferred. As a result, since the stiffness of the shaft is maintained, the gap and the length of the shaft can be appropriately adjusted, and the limitations on miniaturizing the device will be suppressed, so that the required performance criteria can adequately be satisfied. In addition, the balance between the stiffness and the torque loss is regulated, so that the effect of the lubricant can be adequately realized. Since it is paired with radial gap 10, shaft 2 preferably has a diameter of about 1.5 to about 3.5 mm, and further preferably a diameter of about 1.5 to about 3 mm. In this way, the lubricant in the hydrodynamic bearing device of the present invention can utilized to the maximum extent.

For the material of shaft 2, stainless steel is the most suitable. In comparison with other metals, stainless steel has high hardness, and the formation of wear particles can be effectively suppressed when the lubricant used in the hydrodynamic bearing device of the present invention has low viscosity and forms a thin adsorption layer to protect the surface of the shaft. More preferable is martensite stainless steel.

For sleeve 4, the use of a material such as copper alloy, iron alloy, stainless steel, ceramic, or resin is preferred. In addition, a material such as copper alloy, iron alloy or stainless steel that is more wear resistant and has higher workability, as well having a lower cost, is further preferred. Moreover, sintered materials are also satisfactory from the cost perspective, and the same effect can be obtained when the lubricant is impregnated into a sintered material. All or part of the surface of the shaft material and/or the sleeve material can be subjected to a surface modification treatment such as plating, physical vapor deposition, chemical vapor deposition, or diffusion coating.

If the constituent elements of the hydrodynamic bearing device, part or all of which come into contact with the lubricant, are formed from a resin, the wear, frictional characteristics and cost can be improved. Specifically, the shaft, sleeve, thrust plate, thrust flange, and other components can be mentioned as examples. Since the lubricant contains low-polarity ethers, the dissolution and swelling of resin components that may be present and come into contact with the lubricant can be reduced, and any degradation and reduction in performance can be suppressed. The hydrodynamic bearing device of the present invention can provide stable performance over long periods. The resin components can be formed on all or part of the surface as well as the interior by any appropriate method, including methods other than molding, and there is no limitation as to the range or location of the formation. Examples of the types of resins that can be used include polyethylenes, polyimides, polyether imides, fluororesins, polypropylenes, polyamides, polyamidoimides, liquid crystalline polymers, and polyacetals, while the resin is not limited to these types. In the case of fluororesins, the resin components will experience practically no effect with any type of lubricant that is used, while the ether-type lubricants will be particularly advantageous with other types of resins.

Furthermore, as mentioned in the explanation above, radial dynamic pressure-generating grooves are formed on the outer circumferential surface of shaft 2, but they can also be formed on the bearing bore surface of sleeve 4 (inner circumferential surface), as well as on both the outer circumferential surface of shaft 2 and the bearing bore surface of sleeve 4. In other words, at least one of the shaft and the sleeve can possess radial dynamic pressure-generating mechanical features. Examples of dynamic pressure-generating mechanical features that can be mentioned include various types of shapes such as grooves, projections, bumps, and inclined planes. Moreover, for the radial dynamic pressure-generating grooves, various configurations such as a herringbone pattern and a spiral pattern can be employed.

In addition, thrust dynamic pressure-generating grooves can be formed either only on the face of thrust flange 3 opposite to thrust plate 9, or only on the face of thrust plate 9 opposite to thrust flange 3, or only the reverse side of the face of thrust flange 3 opposite to thrust plate 9, as well as on two or more of these three locations.

Furthermore, for any dynamic pressure-generating mechanical features similar to those mentioned above in addition to thrust dynamic pressure-generating grooves, any type of mechanical feature will be satisfactory.

One end of the shaft component is fixed in the Embodiments, although the present invention is not limited to this configuration, and the same effect can be obtained with both ends being fixed or with both ends of the bearing bore of the sleeve being open.

The present invention uses at least one compound selected from the group consisting of compounds having one or more ether bonds and a total carbon number of 24 to 39 as the lubricant.

For the lubricant, at least one type of aliphatic monoether with a total carbon number of 24 to 32 (preferably C26 to C30 with regard to viscosity and amount of evaporation) as represented in generic formula (1) can be used, for example:

$$R^1\text{—}O\text{—}R^2 \quad (1)$$

wherein, $R^1$ represents a C16 or higher alkyl group that possesses at least one side-chain, and $R^2$ represents a C4 or higher alkyl group, and where the carbon number of $R^1$ is higher than the carbon number of $R^2$.

As a result, (1) by maintaining an appropriate viscosity and heat resistance in the lubricant, the amount of evaporation can be reduced and the torque of the bearing can be lowered; (2) the required long-term reliability of the device can be obtained; (3) costs and the possibility of miniaturizing the device can be kept down since the amount of lubricant needed to fill each hydrodynamic bearing device is not increased; and, (4) the low temperature fluidity and viscosity of the lubricant can be maintained at suitable levels, so that the bearing device can start up rotation even at −20° C. or below. These aliphatic monoethers can be synthesized by known etherification reactions, for example by an aliphatic alcohol ($R^1$—OH) being reacted with an alkyl halide ($R^2$—X). Aliphatic monoethers are preferable from the perspective of having suitable viscosity. Moreover, within the aliphatic series, saturated aliphatic monoethers are preferable from the perspective of having high oxidative stability.

In generic formula (1), the $R^1$ that represents a C16 or higher alkyl group that possesses at least one side-chain is normally an aliphatic alcohol residue. C16 to C28 are preferable, and C16 to C20 are more preferable. Furthermore, while $R^1$ can be either a branched- or straight-chain structure, in particular it is preferable for $R^1$ to possess a side-chain at the β-position.

Specific examples of groups that can be named include isohexadecyl, isoheptadecyl, isooctadecyl, isononadecyl, isoeicosyl, isoheneicosyl, isodocosyl, isotricosyl, isotetracosyl, isopentacosyl, isohexacosyl, isoheptacosyl, isooctacosyl, and the like. Among these, alkyl groups with high fluidity and that bear a 2-alkylalkanol residue are preferred, and examples of groups that can be mentioned include 2-hexyldecyl, 2-heptylundecyl, 2-octyldodecyl, 2-nonyltridecyl, 2-decyltetradecyl, 2-undecylpentadecyl, 2-dodecylhexadecyl, and the like. In particular, those groups having excellent low temperature fluidity and possessing a C16 to C20 side-chain at the β-position are preferred, among which those groups that are in general use because they are inexpensive are preferred, such as 2-hexyldecyl, 2-heptylundecyl, 2-octyldodecyl and the like.

In generic formula (1), $R^2$ represents a C4 or higher alkyl group, and is generally an alkyl halide residue. Among these, C4 to C14 groups with high heat resistance are preferred, and C6 to C14 groups are further preferred.

Specific examples of groups that can be named include hexyl, heptyl, octyl, nonyl, decyl, undecyl, dodecyl, tridecyl, tetradecyl, and the like. These can be either straight-chain or branched-chain groups, but straight-chain groups are preferred due to higher heat resistance.

Specific examples of aliphatic monoethers contained in generic formula (1) are below.

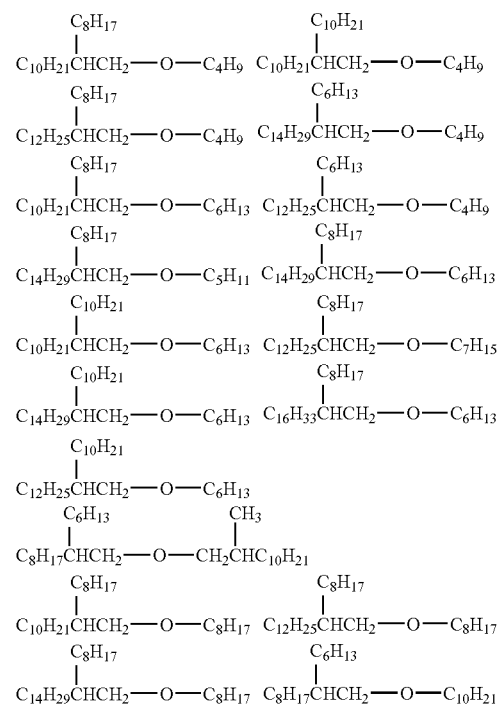

-continued

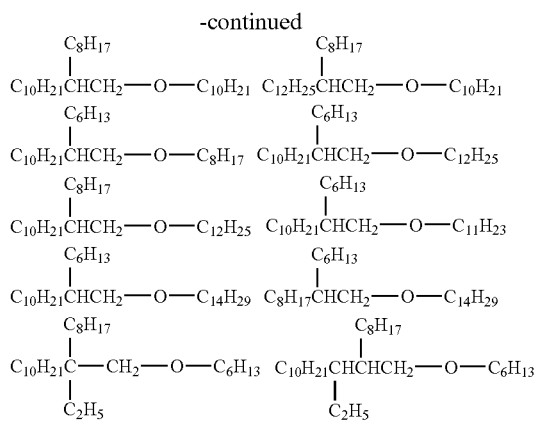

For the lubricant, at least one type of aliphatic diether with a total carbon number of 24 to 32 (preferably C26 to C30 with regard to viscosity and amount of evaporation) as represented in generic formula (2) can be used:

$$R^3\text{—O-A-O—}R^4 \quad (2)$$

wherein, $R^3$ and $R^4$ represent the same or different and each represents a C8 or higher alkyl group, A represents a C5 or higher $C_nH_{2n}$ group, and where at least one of $R^3$, $R^4$, and A possess a branched-chain structure.

As a result, (1) by maintaining an appropriate viscosity and heat resistance in the lubricant, the amount of evaporation can be reduced and the torque of the bearing can be lowered; (2) the required long-term reliability of the device can be obtained; (3) costs and the possibility of miniaturizing the device can be kept down since the amount of lubricant needed to fill each hydrodynamic bearing device is not increased; and, (4) the low temperature fluidity and viscosity of the lubricant can be maintained at suitable levels, so that the bearing device can start up rotation even at −20° C. or below.

These aliphatic diethers can be synthesized by known etherification reactions along with monoethers, for example by a single type of aliphatic alcohol ($R^3$—OH) being reacted with an alkyl dihalide (X-A-X) when $R^3$ is the same as $R^4$. Aliphatic type diethers are preferable from the perspective of having suitable viscosity as is the case with monoethers. Moreover, within the aliphatic series, saturated aliphatic diethers are preferable from the perspective of having high oxidative stability.

In generic formula (2), $R^3$ and $R^4$ represent C8 or higher alkyl groups, among which C8 to C12 groups are preferred for a good balance between heat resistance and low temperature fluidity. In general these will be aliphatic alcohol residues.

Specifically, any straight-chain groups such as octyl, nonyl, decyl, undecyl, dodecyl, and the like, and any branched-chain groups such as 2-ethylhexyl, 3,7-dimethyloctyl, 3,7-diethyloctyl, 3,5,5-trimethylhexyl, 3,5,5-trimethylheptyl, 3,5,5,6-tetramethyloctyl, 3,5,5,7-tetramethyloctyl, 2-propylheptyl, 2-butyloctyl, and the like are satisfactory, although the invention is not limited to these examples.

A represents a $C_nH_{2n}$ group of C5 or higher, among which C5 to C9 is preferred for having high heat resistance, and C6 to C9 is further preferred. Generally these will be alkyl dihalide residues. Specifically, any straight-chain groups such as hexylene, heptylene, octylene, nonylene, and the like, and any branched-chain groups such as 3-methylpentylene, 3,3-dimethylpentylene, 3-ethylpentylene, 3,3-diethylpentylene, 2,4-diethylpentylene and the like are satisfactory, although the invention is not limited to these examples, and among these, groups such as $C_9H_{18}$ that can maintain low viscosity even in a low-temperature environment such as at 0° C. or below and have an excellent balance between low temperature fluidity and heat resistance performance are preferred, and 3,3-diethylpentylene or 2,4-diethylpentylene is further preferred. From the foregoing, it is possible to achieve both a low torque in a low temperature environment and a reduced amount of evaporation for a hydrodynamic bearing device and it is possible to realize a hydrodynamic bearing device for which a low temperature environment (e.g. ≦0° C.) is not an undue burden and where the hydrodynamic bearing device is able to start up rotation.

Moreover, for the aliphatic diethers represented by generic formula (2), at least one of $R^3$, $R^4$ and A will have a branched-chain structure. This makes it possible to realize an excellent balance in performance. More preferable is for one or two from among $R^3$, $R^4$ and A to have a branched-chain structure. More specifically, if A is a straight-chain structure then at least one of $R^3$ and $R^4$ will be a branched-chain structure, and if A is a branched-chain structure then at least one of $R^3$ and $R^4$ will be a straight-chain structure.

Furthermore, $R^3$ and $R^4$ can have either the same or different numbers of carbons. It is preferred to have alkyl groups with different numbers of carbons, from the perspective that the aliphatic diethers of generic formula (2) can combine their characteristics when the two types have different numbers of carbons. In other words, when the numbers of carbons for $R^3$ and $R^4$ are different, it is possible that the low temperature fluidity will be greater than when $R^3$ and $R^4$ are the same, so that the hydrodynamic bearing device will have reduced torque in a low temperature environment.

Concrete examples of aliphatic diethers contained in generic formula (2) are below.

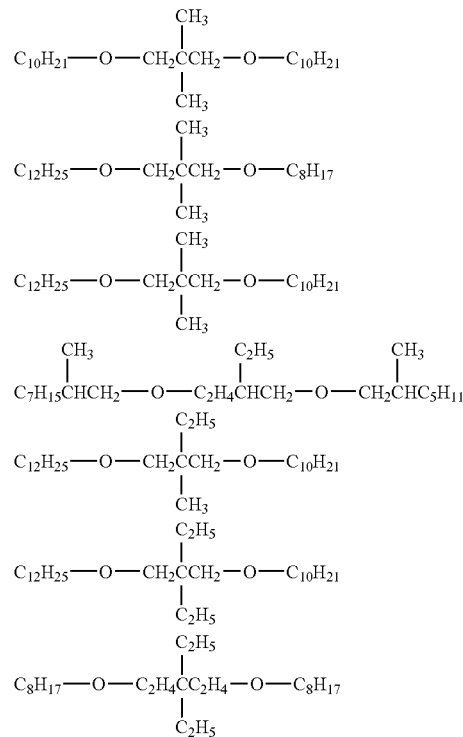

-continued

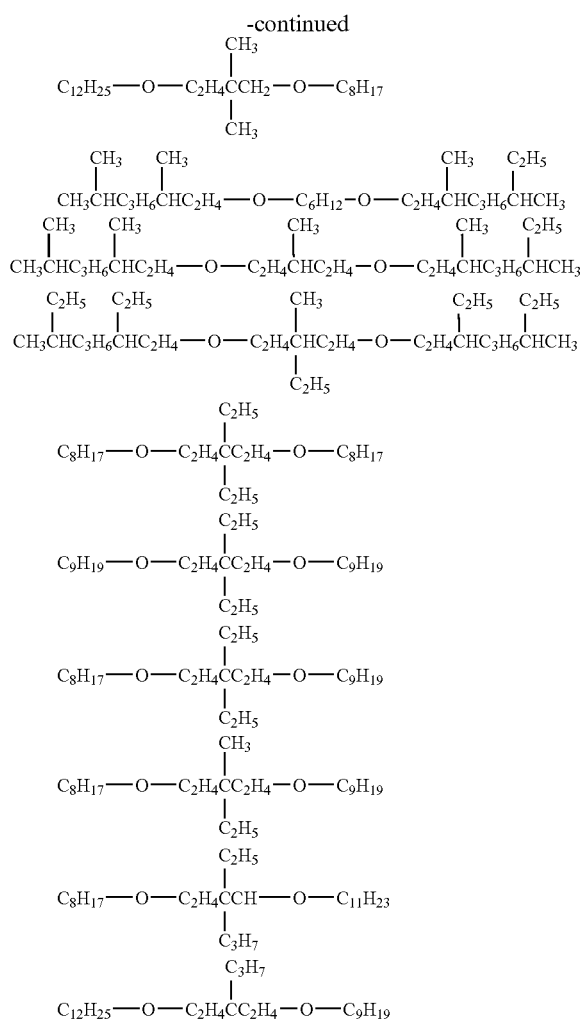

For the lubricant, at least one type of aliphatic triether with a total carbon number of 24 to 32 (preferably C24 to C30 with regard to viscosity and amount of evaporation) as represented in generic formula (3) can be used:

$$R^5\text{—O-Q-O-T-O—}R^6 \tag{3}$$

wherein, $R^5$ and $R^6$ represent the same or different and each represents a C5 or higher alkyl group, Q and T represent the same or different and each represents a C2 or higher $C_nH_{2n}$ group, and where at least one of $R^5$, $R^6$, Q and T possess a branched-chain structure.

Alternatively, at least one type of aliphatic tetraether with a total carbon number of 24 to 39 (preferably C24 to C32, more preferably C24 to C30 with regard to viscosity and amount of evaporation) as represented in generic formula (4) can be used:

$$R^7\text{—O—X—O—Y—O—Z—O—}R^8 \tag{4}$$

wherein, $R^7$ and $R^8$ represent the same or different and each represents a C5 or higher alkyl group, X, Y and Z represent the same or different and each represents a C2 or higher $C_nH_{2n}$ group, and where at least one of $R^7$, $R^8$, X, Y and Z possess a branched-chain structure.

By using these ether compounds, the same effect as mono- or diether compounds can be acquired. Especially, using the tetraether compounds, a viscosity index and a solidification temperature which have the relation of a trade-off can be improved. The viscosity index expresses the temperature dependence of the viscosity of an lubricant, for example the value calculated according to the JIS K2283. When the viscosity index becomes higher, viscosity at high temperature becomes higher, and stiffness can be obtained at high temperatures easily.

These aliphatic triethers and tetraethers can be synthesized by known etherification reactions, for example by a diol (HO-Q-O-T-OH, HO—X—O—Y—O—Z—OH) being reacted with an alkyl monohalide ($R^5$—X, $R^6$—X, $R^7$—X, $R^8$—X). In generic formula (3) and (4), $R^5$ to $R^8$ represent C5 or higher alkyl groups or C6 to C15 alkyl groups, among which C9 to C13 groups are preferred for $R^5$ and $R^6$, C8 to C15 groups are preferred for $R^7$ and $R^8$. In general these will be alkyl monohalide residues. These alkyl groups can be either straight-chain structure or branched-chain structure groups as described above, among which, $R^7$ and $R^8$ are preferred to have the same straight-chain structure alkyl groups.

Q, T, X to Z represent $C_nH_{2n}$ groups of C2 or higher, among which C2 to C9 are preferred, and C2 to C6 are further preferred. Generally these will be diol residues. Specifically, any straight-chain structure groups and any branched-chain structure groups are satisfactory, and among these, 1-methylethylene or 2-methylethylene which is a branched-chain structure is preferred.

Moreover, for the ether compounds represented by generic formula (3) and (4), at least one of $R^5$, $R^6$, Q and T as well as at least one of $R^7$ $R^8$, X, Y and Z will have a branched-chain structure. This makes it possible to realize an excellent balance in performance.

Concrete examples of aliphatic triethers contained in generic formula (3) are below.

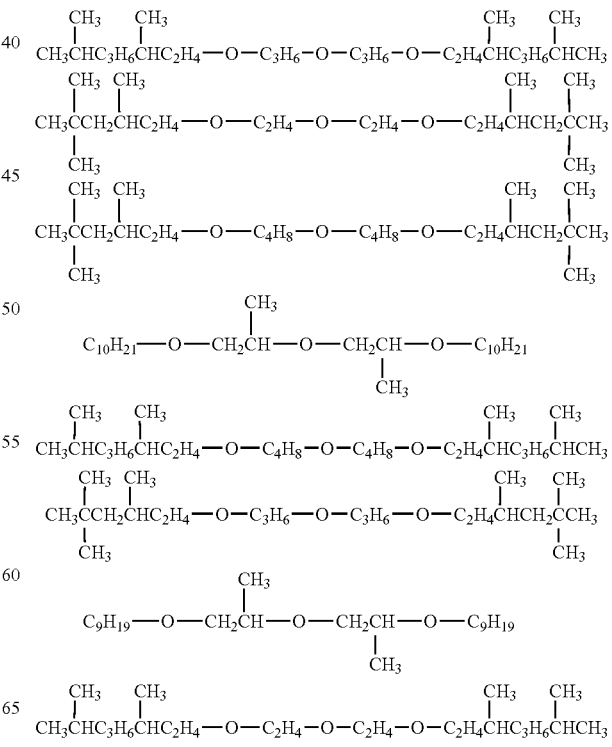

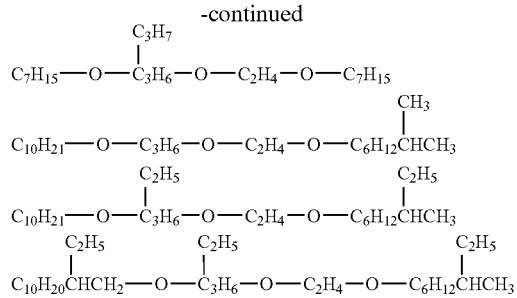
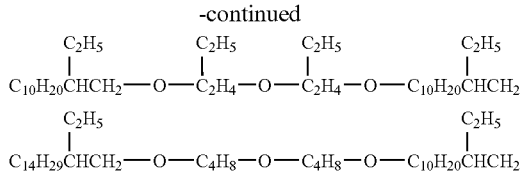
Concrete examples of aliphatic tetraethers contained in generic formula (4) are below.
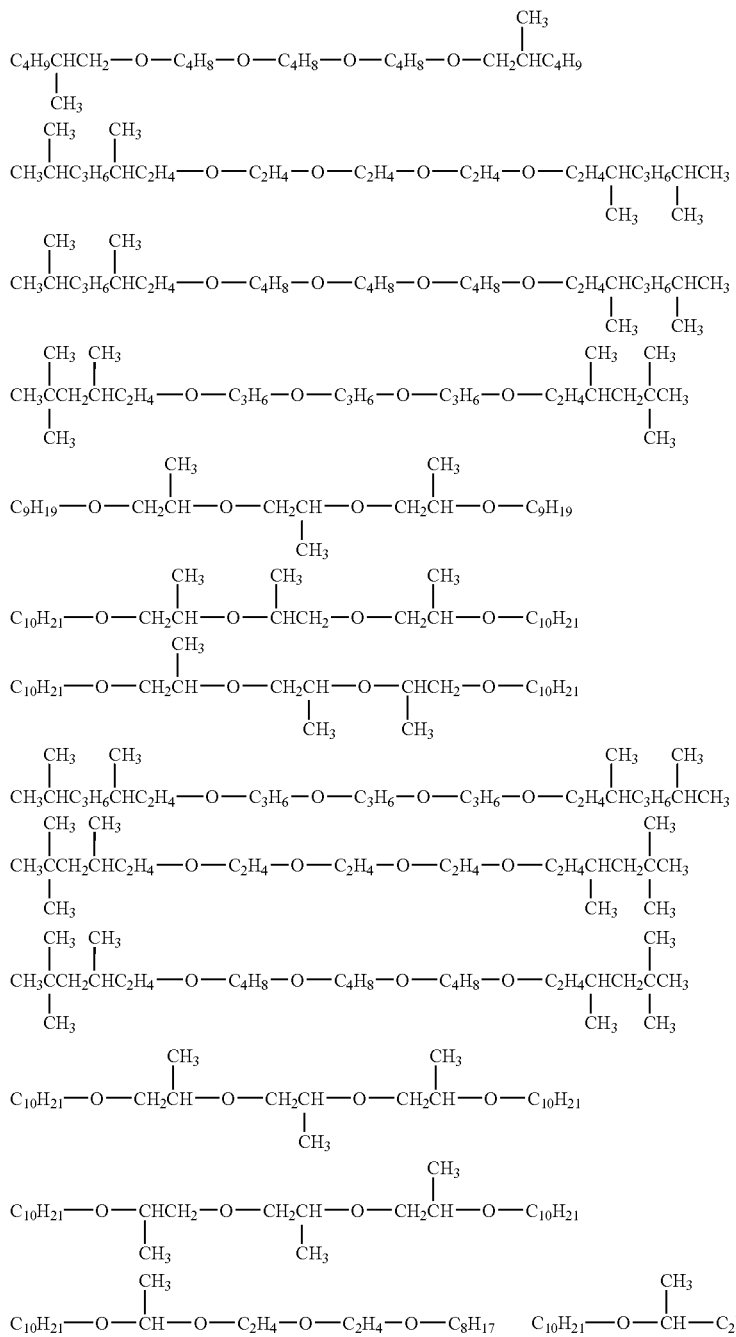

-continued

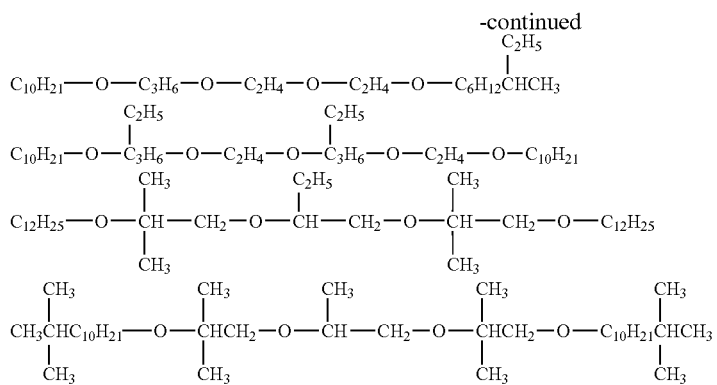

For the lubricant of the present invention, an aliphatic monoether as represented in generic formula (1), either singly or in mixtures of two or more; an aliphatic diether as represented in generic formula (2), either singly or in mixtures of two or more; an aliphatic triether as represented in generic formula (3), either singly or in mixtures of two or more; an aliphatic tetraether as represented in generic formula (4), either singly or in mixtures of two or more; as well as a mixture of two, three, four or more selected from the ethers as represented in generic formula (1) to (4) can be used.

These components, either singly or in mixtures thereof, can furthermore be mixed with other types of added oils. These added oils can be suitably selected in order to reduce or adjust the viscosity, and furthermore in order to increase the heat resistance, or with the aim of adding or supplementing other performance characteristics. Specifically, examples that can be named of compounds that are already known include mineral oil, poly-α-olefins, alkylaromatics, polyglycols, phenyl ethers, polyol esters, diesters of dibasic acids, phosphate esters, and the like. For these added oils, one or two or more types can be added to the mixture. Among these, since polyol esters and diesters of dibasic acids have high heat resistance and excellent fluidity at low temperatures, they are effective at increasing the reliability of the bearing device and maintaining the capability of starting up rotation in low temperature ranges.

Examples of polyol esters that can be named include the esters of fatty acids with neopentyl glycol, trimethylolpropane, and pentaerythritol, while examples of diesters of dibasic acids that can be named include dioctyl sebacate (DOS), dioctyl azelate (DOZ), and dioctyl adipate (DOA), diisononyl adipate, diisodecyl adipate and the like.

The lubricant can be a composition to which additives have been added. The additives can be known compounds selected with the aim of increasing or supplementing other performance characteristics of the base oil. Specifically, one or two or more additives such as antioxidants, rust inhibitors, metal deactivators, oiliness improvers, extreme pressure agents, friction modifiers, anti-wear agents, viscosity index improver, pour-point depressants, antifoaming agents, antistatic additives, conductivity enhancing agents, detergent dispersants, hydrolysis inhibitors and the like can be added to the combination. Additives can cause gas generation or a change in mass associated with degradation, so in order not to diminish the performance of the bearing, the total amount added should be kept to the minimum necessary. The total amount added of the additives is preferable of 0.1 to 10 wt % and more preferable of 0.5 to 5 wt % with respect to total weight of lubricant including a base oil and the additives. In particular, antioxidants may be essential in order to increase the long-term reliability of the hydrodynamic bearing device. Specifically, antioxidants of the phenol type that do not contain sulfur or chlorine in the molecule or of the amine type as well are the most suitable for use with hydrodynamic bearing devices. If additives that contain sulfur or chlorine in the molecule undergo decomposition, corrosive gases will be generated, and there is a concern that these would exert a significant effect on the performance of the device. These types of antioxidants can be used singly or in combination. Among these, for antioxidants that can realize and maintain adequate effectiveness even when used in a device in a high temperature environment of about 80 to about 100° C. or higher, and that have high heat resistance, phenol-type antioxidants that possess two or more phenol units are preferable. When these are used in combination with added amine-type antioxidants, a synergistic effect can be obtained, which is preferable.

Furthermore, compared to a lubricant of the present invention that is low in viscosity and forms a thin adsorption layer to protect the surface, in a comparable conventional case, an increased amount of friction and wear will be produced in contact with the shaft and sleeve when the hydrodynamic bearing device starts and stops. For this reason, it is most preferable to add at least one of an oiliness improver and a metal deactivator that does not contain sulfur or chlorine in the molecule as an additive, and that can readily form a film on the metal surfaces of the shaft and the sleeve in addition to the antioxidant. Specifically, a benzotriazole-type compound is recommended as a metal deactivator that does not contain sulfur or chlorine in the molecule, and a fatty acid or a phosphate ester is recommended as an oiliness improver.

With the bearing configuration being held constant, since the power consumption of the motor will be greater with a lubricant of higher viscosity, and moreover since the power consumption will be greater with higher motor rpm, it is better for the viscosity of the lubricant to be lower. However, when the viscosity of the lubricant is low, it will be necessary to reduce the radial gap in order to maintain the stiffness of the shaft. If the radial gap is made too small, there is a greater likelihood that adventitious foreign matter will cause the rotation of the bearing to lock, which reduces the reliability of the device. Accordingly, the viscosity of the lubricant at 20° C. is preferably about 5 to about 35 mPa·s, more preferably about 5 to about 30 mPa·s, and about 10 to about 25 mPa·s is particularly preferable. At the usual upper temperature limit of 80° C. for bearing use, the viscosity is preferably about 2 to about 5 mPa·s, more preferably about 2.5 to about 4.5 mPa·s, and about 2.5 to about 4 mPa·s is particularly preferable.

Since there is less of a tendency for the lubricant of the present invention to undergo temperature-dependent changes in viscosity as compared to conventional lubricants, there are no concerns that use for long-periods or at high rpms will cause marked changes in the viscosity, even if the lubricant doesn't contain viscosity index improvers. As a result, it is possible for the hydrodynamic bearing device of the present invention both to maintain adequate stiffness in a high-temperature environment and also to have lowered torque in a low-temperature environment. In the present invention, since an undue load will not be placed on the hydrodynamic bearing device during the start up of rotation even in a low-temperature environment (for example $\leq -20°$ C.), it is possible to realize a hydrodynamic bearing device that has high reliability over a broader range of operating temperatures. Therefore, the present invention, for example, can also be applied to the hydrodynamic bearing devices used in mobile bodies.

According to the JIS-C2101 standard, the amount of evaporation of a lubricant is satisfactory if it is $\leq 4$ wt % when heated to 150° C. for an 24 hour period.

Moreover, low-temperature solidification should take place preferably at a temperature of $\leq -20°$ C., more preferably at $\leq -40°$ C. As a result, even in a low-temperature environment of about $-20°$ C. that is the lower limit of the operating temperature of a conventional bearing, it is possible to start up rotation without placing an undue load on the hydrodynamic bearing device or the spindle motor. However, the low-temperature solidification temperature is different from the pour-point for the lubricant that is generally measured according to the JIS-K2269 standard. The low-temperature solidification point is the temperature at which all or part of the lubricant sample in a cup solidifies after being allowed to stand in a thermal bath for two days, which is a temperature that is several to several tens of degrees higher than the pour-point temperature.

Furthermore, when filling the hydrodynamic bearing device with lubricant, it is recommended for the lubricant to be filtered beforehand through a filter with a pore diameter less than the dimensions of the smallest radial gap (for example, either pressurized or reduced pressure filtration), in order to remove foreign matter. If foreign matter is allowed to enter the device, there is a greater likelihood of producing the type of bearing lock up mentioned above.

Embodiment 2

Figure 1:
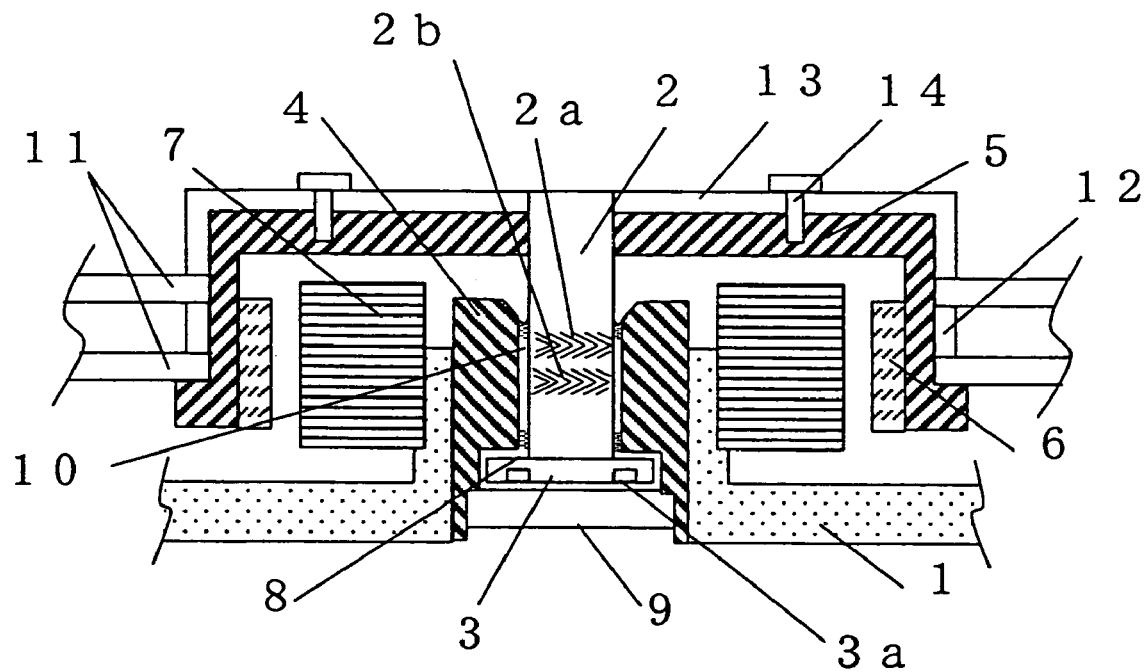
FIG. 1 is a cross section drawing of a magnetic disk device and a spindle motor that has the rotating shaft-type hydrodynamic bearing device in Embodiment 2 of the present invention.

Embodiment 2 of the present invention is explained by using FIG. 1. FIG. 1 is a cross section drawing of the main component of an information device equipped with a spindle motor that possesses a rotating shaft-type hydrodynamic bearing device of Embodiment 2. The hydrodynamic bearing device in this Embodiment differs from the hydrodynamic bearing device in Embodiment 1 in FIG. 2 in the point that the present Embodiment has a rotating shaft type while Embodiment 1 has a fixed shaft type. With the exception of this point, Embodiment 2 is identical to Embodiment 1, and any of the elements having identical symbols have been omitted from the explanation.

In FIG. 1, radial dynamic pressure-generating grooves 2a and 2b are formed in a herringbone pattern on the outer circumferential surface of shaft 2, and the one end of shaft is affixed to thrust flange 3, and the other end is press fitted into hub 5. Shaft 2 and thrust flange 3 form the shaft component. In hub 5, two magnetic disks made of glass 11 are layered about inserted spacer 12, and are fixed by clamp 13 with inserted retaining screws 14. Moreover, rotor magnet 6 is affixed to the inner circumferential surface of hub 5. The shaft component (shaft 2 and thrust flange 3), hub 5, rotor magnet 6, magnetic disks 11, spacer 12, clamp 13, and retaining screws 14 constitute the rotating component. The present invention does not necessarily need to include all of the shaft 2, thrust flange 3, hub 5, rotor magnet 6, magnetic disks 11, spacer 12, clamp 13 and retaining screws 14 as the rotating component.

At the same time, sleeve 4 that is pressure fitted into base 1 possesses a bearing bore that bears the shaft component. Thrust plate 9 is mounted on one end of sleeve 4. The shaft component is inserted into the bearing bore of sleeve 4 in such a manner as to face thrust plate 9 and thrust flange 3. Stator coil 7 is mounted on a wall formed by base 1. Sleeve 4, thrust plate 9, and stator coil 7 and base 1 form the fixed component. The present invention does not necessarily need to include all of the sleeve 4, thrust plate 9, stator coil 7 and base 1 as the fixed component. Thrust dynamic pressure-generating groove 3a is formed in a herringbone pattern on the surface of thrust flange 3 opposite to thrust plate 9. The bearing device is constituted when lubricant 8 is filled into the gap between the bearing bore and the shaft component. The rotating component and the fixed component constitute the motor drive component.

The rotational driving action of the rotating component due to this motor drive component will be explained.

First, stator coil 7 is energized to produce a rotating magnetic field, and rotor magnet 6 that is mounted to face stator coil 7 will experience rotational force, so that hub 5, shaft 2, magnetic disk 11, clamp 13 and spacer 12 all begin to rotate together. Due to this rotation, herringbone-shaped dynamic pressure-generating grooves 2a, 2b and 3a gather up lubricant 8, and pumping pressure is generated in the radial direction together with in the thrust direction (between shaft 2 and sleeve 4, and between thrust flange 3 and thrust plate 9). As a result, the rotating component is buoyed upwards with respect to the fixed portion and is rotatably supported without contact, so that recording and playback of data on magnetic disk 11 is possible.

Furthermore, without being limiting in any way, the material of magnetic disk 11 mounted on hub 5 can be glass or aluminum, and in the case of small-scale machine types, without being limiting in any way, usually one to two plates are attached. Among these, information devices and spindle motors equipped with small-scale magnetic disks $\leq 2.5$ inches in size are effective for the present invention.

Embodiment 3

Figure 3:
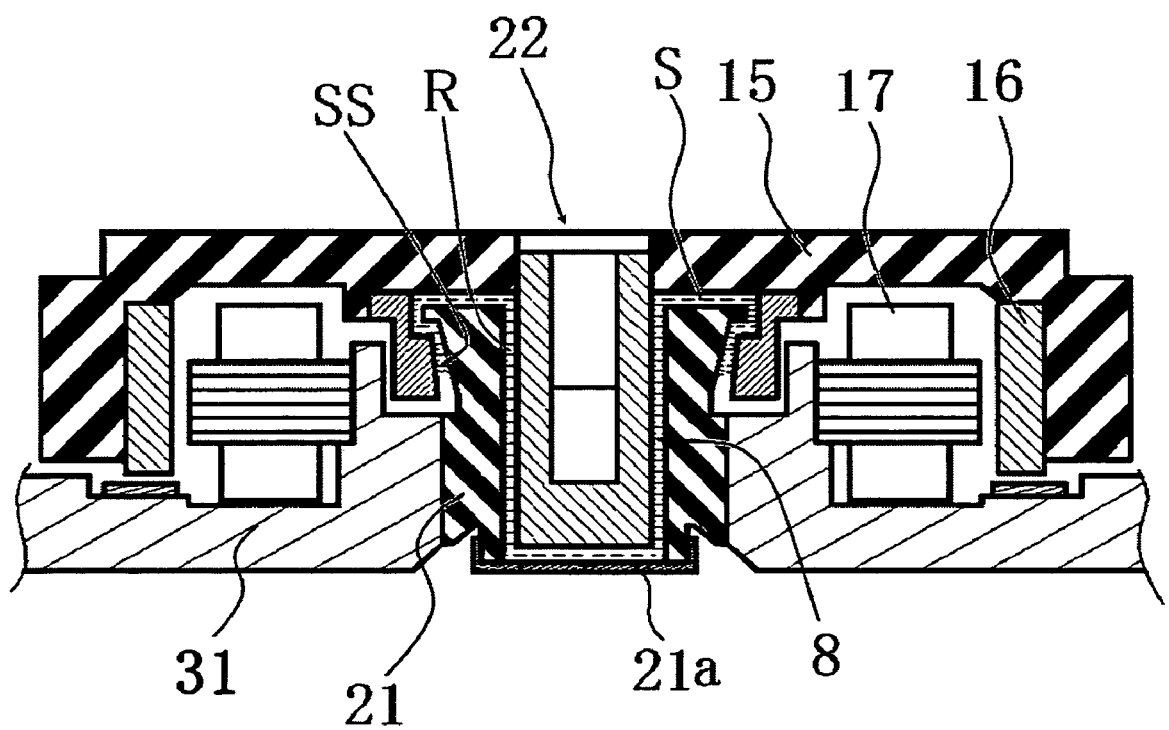
FIG. 3 is a cross section drawing of a hydrodynamic bearing device of Embodiment 3 of the present invention.

FIG. 3 is a cross section drawing of the main component of an information device equipped with a spindle motor that possesses a rotating shaft-type hydrodynamic bearing device.

In this information device, a sleeve 21 that pressure fitted into the center of base 31 possessed a bearing bore that bears the shaft 22. Stator coil 17 is mounted on a wall formed by the base 31. The shaft 22 is inserted into the bearing bore of sleeve 21 from one end and the other end of the bearing bore is closed over by a cap 21a. Radial dynamic pressure-generating grooves (not shown) are formed in a herringbone pattern on the outer circumferential surface of shaft 22, and the one end of shaft 22 is press fitted into hub 15 as well as the other end of shaft 22 is opposed to the cap 21a. The outer circumferential surface of the shaft 22 (a dynamic-pressure surface) radially oppose to the inner circumferential surface of the sleeve 21 (a dynamic-pressure surface) interposed a gap R therebetween and the gap R is filled with a lubricant 8. A rotor magnet 16 is affixed to the inner circumferential surface of hub 15. Shaft 22 and hub 15 form a rotating component.

The upper end face of the sleeve 21 (a dynamic-pressure surface) and the undersurface of the hub 15 (a dynamic-pressure surface) are disposed so as to axially oppose to each other interposed a gap S therebetween. Thrust dynamic-pressure-generating grooves in a spiral pattern are formed in at least one of either of dynamic-pressure surfaces of the sleeve 21 or hub 15 (not shown in FIG. 3). This gap S is filled with the lubricant 8, from the gap R to the gap S, this lubricant 8 is charged with in an essentially continuous manner and without interruption.

When the shaft 22 and the hub 15 rotate, dynamic pressure generates within the lubricant 8 by the action of the thrust dynamic pressure generating grooves described above. Due to the dynamic pressure, shaft 22 and hub 15 are buoyed upwards with respect to the thrust direction and is rotatably supported without contact.

The seal section SS having a gap is provided on the outer circumferential surface of the sleeve 21. The gap in which the seal section SS is formed connects with the gap S at the diametrically outer side of sleeve 21 and is configured to expand heading downward. Thus, the seal section SS prevents external outflow of the lubricant 8.

The spindle motors and information devices of the present invention are explained in more detail below. Furthermore, the amounts (wt %) of additives added to the compositions of the present invention are given in proportion to the total weight of the lubricant containing both the base oil and the additives.

Working Examples 1 Through 10, Comparative Examples 1 Through 3

The lubricants were obtained by combining 0.5 wt % of n-octadecyl-3-(3,5-di-tert-butyl-4-hydroxyphenyl)propionate as the antioxidant with the base oils shown in Table 1.

The base oil of Working Example 1 is butyl isoeicosyl ether, for Working Example 2 is hexyl-2-octyldodecyl ether, for Working Example 3 is 1,3-bis-(decoxy)-2,2-dimethylpropane, for Working Example 4 is 1,5-bis-(octoxy)-3,3-diethylpentane, for Working Example 5 is 1,6-bis-(3,7-dimethyloctoxy)hexane, for Working Example 6 is a mixture of the three components 1,5-bis-(octoxy/nonoxy)-3,3-diethylpentane, for Working Example 7 is 1-nonoxy-5-octoxy-3,3-diethylpentane, for Working Example 8 is di-(1,2-propylene glycol) dinonyl ether, for Working Example 9 is tri-(1,2-propylene glycol) dinonyl ether, and for Working Example 10 is tri-(1,2-propylene glycol) didecyl ether.

For the Comparative Examples, except for the conventional base oils shown in Table 1 as lubricants, the lubricants were obtained in the same manner as for the Working Examples. The lubricant of Comparative Example 1 is dioctyl sebacate (DOS), the lubricant of Comparative Example 2 is the polyol ester obtained from neopentyl glycol and n-octanoic acid, and the lubricant of Comparative Example 3 is 1,4-bis-(3,5,5-trimethylhexoxy)butane.

TABLE 1

| Working Example | Base Oil |
|---|---|
| 1 | $C_{10}H_{21}CH(C_8H_{17})CH_2-O-C_4H_9$ |
| 2 | $C_{10}H_{21}CH(C_8H_{17})CH_2-O-C_6H_{13}$ |
| 3 | $C_{10}H_{21}-O-CH_2C(CH_3)_2CH_2-O-C_{10}H_{21}$ |
| 4 | $C_8H_{17}-O-C_2H_4C(C_2H_5)_2C_2H_4-O-C_8H_{17}$ |
| 5 | $CH_3CH(CH_3)C_3H_6CH(CH_3)C_2H_4-O-C_6H_{12}-O-C_2H_4CH(CH_3)C_3H_6CH(CH_3)CH_3$ |
| 6 | $C_8H_{17}/C_9H_{19}-O-C_2H_4C(C_2H_5)_2C_2H_4-O-C_8H_{17}/C_9H_{19}$ |

TABLE 1-continued

| | Base Oil |
|---|---|
| 7 | $C_8H_{17}-O-C_2H_4\underset{\underset{C_2H_5}{|}}{\overset{\overset{C_2H_5}{|}}{C}}C_2H_4-O-C_9H_{19}$ |
| 8 | $C_9H_{19}-O-\underset{}{\overset{\overset{CH_3}{|}}{CH}}-CH_2-O-\underset{}{\overset{\overset{CH_3}{|}}{CH}}-CH_2-O-C_9H_{19}$ |
| 9 | $C_9H_{19}-O-\overset{\overset{CH_3}{|}}{CH}-CH_2-O-\overset{\overset{CH_3}{|}}{CH}-CH_2-O-\overset{\overset{CH_3}{|}}{CH}-CH_2-O-C_9H_{19}$ |
| 10 | $C_{10}H_{21}-O-\overset{\overset{CH_3}{|}}{CH}-CH_2-O-\overset{\overset{CH_3}{|}}{CH}-CH_2-O-\overset{\overset{CH_3}{|}}{CH}-CH_2-O-C_{10}H_{21}$ |
| Comp. Ex. | |
| 1 | $C_4H_9\overset{\overset{C_2H_5}{|}}{CH}CH_2-O\overset{\overset{O}{\|}}{C}-C_8H_{16}-\overset{\overset{O}{\|}}{C}O-CH_2\overset{\overset{C_2H_5}{|}}{CH}C_4H_9$ (DOS) |
| 2 | $C_7H_{15}-\overset{\overset{O}{\|}}{C}O-CH_2\underset{\underset{CH_3}{|}}{\overset{\overset{CH_3}{|}}{C}}CH_2-O\overset{\overset{O}{\|}}{C}-C_7H_{15}$ |
| 3 | $CH_3\underset{\underset{CH_3}{|}}{\overset{\overset{CH_3}{|}}{C}}CH_2\overset{\overset{CH_3}{|}}{CH}C_2H_4-O-C_4H_8-O-C_2H_4\overset{\overset{CH_3}{|}}{CH}CH_2\underset{\underset{CH_3}{|}}{\overset{\overset{CH_3}{|}}{C}}CH_3$ |

Moreover, the radial gap between the shaft and the sleeve is 2.5 μM, the shaft is martensite stainless steel with a diameter of 3 mm, the sleeve is a nickel-plated copper alloy with a spindle motor that is equipped with a hydrodynamic bearing device, and the lubricants in Working Examples 1 through 10 and Comparative Examples 1 through 3 are filled in with the corresponding required identical amounts.

The motor consumption current was measured at 5400 rpm in 0° C. and 20° C. environments. The motor energy consumption values are shown with the motor consumption current in Comparative Example 1 at 20° C. set to a value of 100.

In addition, after 500 hours of continuous rotation at 100° C., hub 5 and magnetic disk 11 were removed, and in the gap between the open end of sleeve 4 (the top side in FIG. 1) and shaft 2, the presence of the fluid level, that is the fluid fill level for the lubricant, was identified from the upper surface and evaluated using a microscope. When the lubricant fluid level could not be identified, it was assumed that the quantity of lubricant had diminished through evaporation, and since the liquid level had dropped to the interior of the bearing, the amount of lubricant was insufficient to the requirements for sustained performance, and the Example was judged as having inadequate reliability.

Furthermore, after the spindle motors were allowed to stand for 5 hours in a −40° C. environment, each of them was evaluated for whether it could start up rotation at −40° C.

These results are shown in Table 2.

TABLE 2

| | Total carbon number | Motor consumption current | | Liquid level | Start up rotation | Viscosity Index | Solidification Temp. |
|---|---|---|---|---|---|---|---|
| | | 0° C. | 20° C. | present | −40° C. | (—) | (° C.) |
| Working Ex. 1 | 24 | 119 | 70 | + | + | 127 | −50> |
| Working Ex. 2 | 26 | 135 | 76 | + | + | 128 | −45 |
| Working Ex. 3 | 25 | 112 | 69 | + | + | 174 | −40 |
| Working Ex. 4 | 25 | 118 | 70 | + | + | 128 | −50> |
| Working Ex. 5 | 26 | 151 | 82 | + | + | 149 | −50> |
| Working Ex. 6 | 25-27 | 133 | 75 | + | + | 128 | −50> |
| Working Ex. 7 | 26 | 137 | 75 | + | + | 128 | −50> |
| Working Ex. 8 | 24 | 98 | 64 | + | + | 165 | −50> |
| Working Ex. 9 | 27 | 116 | 71 | + | + | 178 | −50> |
| Working Ex. 10 | 29 | 137 | 79 | + | + | 185 | −50> |
| Comp. Ex. 1 | — | 209 | 100 | + | + | 152 | −50> |

TABLE 2-continued

|  | Total carbon number | Motor consumption current 0° C. | Motor consumption current 20° C. | Liquid level present | Start up rotation −40° C. | Viscosity Index (—) | Solidification Temp. (° C.) |
|---|---|---|---|---|---|---|---|
| Comp. Ex. 2 | — | 137 | 76 | − | + | 125 | −50> |
| Comp. Ex. 3 | 22 | 108 | 66 | − | + | 149 | −45 |

As is clear from Tables 1 and 2, all of the Working Examples 1 through 10 have reduced motor consumption current at 0° C. and 20° C. when compared to the Comparative Example 1. Furthermore, a liquid level was identified in all of Working Examples 1 through 10, and they were all able to start up rotation even in an extremely low temperature environment such as −40° C. In particular, the lubricants having high viscosity index and low solidification temperature were obtained by using tetraether compounds.

At the same time, the motor consumption current in Comparative Examples 2 and 3 was somewhat lower than in Working Examples 1 through 10, but the liquid level could not be identified, and thus there was inadequate reliability due to the significant amount of evaporation.

Working Examples 11 Through 34

With the exception of the base oil used that is shown in Table 3, these Working Examples produce devices that possess the same constitution as Working Example 1. When these are evaluated in the same manner, the effect obtained is identical to that from Working Examples 1 through 10.

TABLE 3

| Working Ex. | Base Oil |
|---|---|
| 11 | $C_8H_{17}\overset{\overset{\displaystyle C_6H_{13}}{\mid}}{C}HCH_2-O-C_{10}H_{21}$ |
| 12 | Working Ex. 1 + Working Ex. 2 |
| 13 | Working Ex. 1 + Working Ex. 8 |
| 14 | Working Ex. 2 + Working Ex. 8 |
| 15 | $C_9H_{19}-O-C_2H_4\overset{\overset{\displaystyle C_2H_5}{\mid}}{\underset{\underset{\displaystyle C_2H_5}{\mid}}{C}}C_2H_4-O-C_9H_{19}$ |
| 16 | Working Ex. 4 + Working Ex. 12 |
| 17 | Working Ex. 12 + Working Ex. 5 |
| 18 | Working Ex. 3 + Working Ex. 5 |
| 19 | Working Ex. 5 + Working Ex. 6 |
| 20 | Working Ex. 2 + Working Ex. 12 |
| 21 | Working Ex. 2 + Working Ex. 5 |
| 22 | Working Ex. 2 + Working Ex. 6 |
| 23 | Working Ex. 5 + Working Ex. 10 |
| 24 | Working Ex. 6 + Working Ex. 10 |
| 25 | Working Ex. 7 + Working Ex. 10 |
| 26 | $C_{10}H_{21}-O-\overset{\overset{\displaystyle CH_3}{\mid}}{\underset{\underset{\displaystyle CH_3}{\mid}}{C}H_2}-O-\overset{\overset{\displaystyle CH_3}{\mid}}{\underset{\underset{\displaystyle CH_3}{\mid}}{C}H_2}-O-C_{10}H_{21}$ |
| 27 | Working Ex. 1 + Working Ex. 23 |
| 28 | Working Ex. 6 + Working Ex. 23 |
| 29 | Working Ex. 1 + Working Ex. 6 + Working Ex. 23 |
| 30 | $C_6H_{13}\overset{\overset{\displaystyle CH_3}{\mid}}{C}HCH_2-O-\overset{\overset{\displaystyle CH_3}{\mid}}{C}HCH_2-O-\overset{\overset{\displaystyle CH_3}{\mid}}{C}HCH_2-O-\overset{\overset{\displaystyle CH_3}{\mid}}{C}HCH_2-O-C_6H_{12}\overset{\overset{\displaystyle CH_3}{\mid}}{C}HCH_3$ |
| 31 | Working Ex. 1 + Working Ex. 27 |
| 32 | Working Ex. 6 + Working Ex. 27 |
| 33 | Working Ex. 1 + 6 + 27 |
| 34 | Working Ex. 1 + 6 + 8 + 10 |

From the foregoing, it can be seen that hydrodynamic bearing devices and spindle motors of the present invention have lower power consumption and higher reliability, are more suitable for miniaturization, and have a long operational lifetime.

INDUSTRIAL APPLICABILITY

Information devices and spindle motors using same that relate to the present invention can find application as motors for information device, i.e., magnetic disk devices (hard disk devices), scanner devices, laser beam printers, video recorders and optical disk devices. In particular, magnetic disk devices and spindle motors equipped with small-scale magnetic disks 2.5 or less inches in size are effective for the present invention. Furthermore, the present invention can, for example, also be applied to hydrodynamic bearing devices used in mobile devices.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A hydrodynamic bearing device, comprising at least one of a rotating component and a fixed component having a dynamic pressure-generating mechanism, and a lubricant present in a gap between the rotating component and the fixed component;

wherein the lubricant contains at least one compound selected from the group consisting of aliphatic ethers represented by Formula (2) and Formula (4);

$$R^3\text{—}O\text{—}A\text{—}O\text{—}R^4 \tag{2}$$

$$R^7\text{—}O\text{—}X\text{—}O\text{—}Y\text{—}O\text{—}Z\text{—}O\text{—}R^8 \tag{4},$$

wherein:
$R^3$ and $R^4$ represent a $C_8$ to $C_{12}$ alkyl group,
A is 3,3-diethylpentylene or 2,4-diethylpentylene,
$R^7$ and $R^8$ each represents a $C_9$ to $C_{11}$ alkyl group, and
X, Y and Z are each 2-methylethylene, and
the aliphatic ether of Formula (2) has a total carbon number of 25 to 32.

* * * * *

UNITED STATES PATENT AND TRADEMARK OFFICE
CERTIFICATE OF CORRECTION

PATENT NO. : 7,737,095 B2  Page 1 of 1
APPLICATION NO. : 11/360509
DATED : June 15, 2010
INVENTOR(S) : Takanori Shiraishi et al.

It is certified that error appears in the above-identified patent and that said Letters Patent is hereby corrected as shown below:

Title page item (30) the Foreign Application Priority Data, before

"Oct. 28, 2005 (JP) .....................2005-314680", the following should be included:

--Aug. 30, 2004 (JP) .....................2004-250428--.

Signed and Sealed this

Twenty-sixth Day of October, 2010

David J. Kappos
*Director of the United States Patent and Trademark Office*